United States Patent
Ernst et al.

(10) Patent No.: US 10,900,383 B2
(45) Date of Patent: Jan. 26, 2021

(54) SYSTEMS AND METHODS FOR EXPANDING FLOW IN A WASTE HEAT RECOVERY SYSTEM

(71) Applicant: CUMMINS INC., Columbus, IN (US)

(72) Inventors: Timothy C. Ernst, Columbus, IN (US); Christopher R. Nelson, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 16/483,949

(22) PCT Filed: Feb. 10, 2017

(86) PCT No.: PCT/US2017/017424
§ 371 (c)(1),
(2) Date: Aug. 6, 2019

(87) PCT Pub. No.: WO2018/147867
PCT Pub. Date: Aug. 16, 2018

(65) Prior Publication Data
US 2020/0088068 A1    Mar. 19, 2020

(51) Int. Cl.
*F01K 23/06* (2006.01)
*F01K 23/10* (2006.01)
(Continued)

(52) U.S. Cl.
CPC ............ *F01K 23/065* (2013.01); *F01K 23/10* (2013.01); *F01K 13/02* (2013.01); *F01K 25/08* (2013.01);
(Continued)

(58) Field of Classification Search
CPC ........ F01K 23/065; F01K 23/10; F01K 13/02; F01K 25/08; F01K 23/106; F01K 7/06;
(Continued)

(56) References Cited

U.S. PATENT DOCUMENTS

| | | |
|---|---|---|
| 3,830,062 A | 8/1974 | Morgan |
| 4,183,220 A | 1/1980 | Shaw |

(Continued)

FOREIGN PATENT DOCUMENTS

| | | |
|---|---|---|
| EP | 0 241 049 | 10/1987 |
| EP | 2 735 710 | 5/2014 |
| JP | H626400 A | 2/1994 |

OTHER PUBLICATIONS

International Search Report & Written Opinion for PCT/US2017/017424 dated Apr. 25, 2017, 9 pages.
(Continued)

*Primary Examiner* — Audrey K Bradley
*Assistant Examiner* — Edward Bushard
(74) *Attorney, Agent, or Firm* — Foley & Lardner LLP

(57) ABSTRACT

A waste heat recovery system includes a first heat exchanger, a second heat exchanger, and an expander. The first heat exchanger receives working fluid from a first portion of a first loop and provides the working fluid to a second portion of the first loop. The second heat exchanger receives the working fluid from a first portion of a second loop and provides the working fluid to a second portion of the second loop. The expander provides the working fluid to a first portion of a common line. The expander includes a stator. The stator includes a first inlet and a second inlet. The common line provides the working fluid to both the first loop and the second loop upstream of the first portion of the first loop and upstream of the first portion of the second loop.

18 Claims, 6 Drawing Sheets

(51) Int. Cl.
*F01K 13/02* (2006.01)
*F01K 25/08* (2006.01)
*F01N 5/02* (2006.01)
*F02G 5/04* (2006.01)

(52) U.S. Cl.
CPC .................. *F01N 5/02* (2013.01); *F02G 5/04* (2013.01); *F02G 2260/00* (2013.01)

(58) Field of Classification Search
CPC .......... F01N 5/02; F01N 2240/20; F01N 3/02; F01N 5/00; F02G 5/04; F02G 2260/00; Y02T 10/12; F01D 1/023
See application file for complete search history.

(56) References Cited

U.S. PATENT DOCUMENTS

| | | |
|---|---|---|
| 4,241,591 A | 12/1980 | Edwards |
| 4,586,338 A | 5/1986 | Barrett et al. |
| 4,704,861 A | 11/1987 | Mowill |
| 5,357,746 A | 10/1994 | Myers et al. |
| 6,668,537 B1 | 12/2003 | Hays |
| 7,028,476 B2 | 4/2006 | Proeschel |
| 7,866,157 B2 | 1/2011 | Ernst et al. |
| 8,186,161 B2 | 5/2012 | Ast et al. |
| 8,302,399 B1 | 11/2012 | Freund et al. |
| 8,627,663 B2 | 1/2014 | Ernst et al. |
| 8,635,871 B2 | 1/2014 | Ernst et al. |
| 8,664,785 B2 | 3/2014 | Madison |
| 8,683,801 B2 | 4/2014 | Ernst et al. |
| 8,752,378 B2 | 6/2014 | Ernst et al. |
| 8,776,517 B2 | 7/2014 | Ernst et al. |
| 8,800,285 B2 | 8/2014 | Ernst et al. |
| 8,826,638 B1 | 9/2014 | Gurin |
| 8,826,662 B2 | 9/2014 | Ernst et al. |
| 8,919,328 B2 | 12/2014 | Nelson et al. |
| 9,003,798 B2 | 4/2015 | Yanagi |
| 9,021,808 B2 | 5/2015 | Nelson et al. |
| 9,115,603 B2 | 8/2015 | Leibowitz et al. |
| 9,140,209 B2 | 9/2015 | Ernst et al. |
| 9,334,760 B2 | 5/2016 | Ernst et al. |
| 9,470,115 B2 | 10/2016 | Ernst et al. |
| 9,638,067 B2 | 5/2017 | Nelson et al. |
| 9,702,272 B2 | 7/2017 | Ernst et al. |
| 2004/0020206 A1 | 2/2004 | Sullivan et al. |
| 2010/0192574 A1 | 8/2010 | Langson |
| 2013/0336768 A1 | 12/2013 | Higashimori et al. |
| 2015/0040560 A1 | 2/2015 | Jozsa et al. |

OTHER PUBLICATIONS

Supplementary EP Search Report for EP 17895559.7, dated Apr. 15, 2020.

Supplementary European Search Report for EP Application No. 17895559.7, dated Sep. 14, 2020.

SYSTEMS AND METHODS FOR EXPANDING FLOW IN A WASTE HEAT RECOVERY SYSTEM

STATEMENT REGARDING FEDERALLY SPONSORED RESEARCH OR DEVELOPMENT

This invention was made with government support under Department of Energy Contract No. DE-EE0007281 awarded by the Department of Energy. The government has certain rights in the invention.

CROSS-REFERENCE TO RELATED PATENT APPLICATIONS

This application is the United States national phase of PCT Application No. PCT/US2017/017424, filed Feb. 10, 2017, the entire disclosure of which is incorporated herein by reference.

TECHNICAL FIELD

The present application relates generally to the field of waste heat recovery systems for internal combustion engines.

BACKGROUND

In operation, internal combustion engines discharge heat energy into the external environment through exhaust gas, engine cooling systems, charge air cooling systems, etc. The discharged heat energy that is not used to perform useful work is typically known as "waste heat." Waste heat recovery systems capture a portion of the waste heat to perform useful work. Some waste heat recovery systems utilize a Rankine cycle ("RC"). The RC is a thermodynamic process in which heat is transferred to a working fluid in an RC circuit. The working fluid is pumped into a heat exchanger where it is vaporized. The vapor is passed through an expander and then through a condenser, where the vapor is condensed back to a liquid. The expanding working fluid vapor causes a rotor in the expander to rotate, thereby converting the waste heat energy to mechanical energy. The mechanical energy may be transmitted to engine system components, such as a pump, a compressor, a generator, and other similar devices.

SUMMARY

In an embodiment, a waste heat recovery system includes a first heat exchanger, a second heat exchanger, and an expander. The first heat exchanger receives working fluid from a first portion of a first loop and provides the working fluid to a second portion of the first loop. The second heat exchanger receives the working fluid from a first portion of a second loop and provides the working fluid to a second portion of the second loop. The expander provides the working fluid to a first portion of a common line. The expander includes a stator and a rotor. The stator includes a first inlet and a second inlet. The first inlet receives the working fluid from the second portion of the first loop. The second inlet receives the working fluid from the second portion of the second loop. The rotor rotates relative to the stator. The common line provides the working fluid to both the first loop and the second loop upstream of the first portion of the first loop and upstream of the first portion of the second loop.

In another embodiment, an expander for a waste heat recovery system includes a frame, a rotor, and a stator. The frame couples the expander to a structure. The rotor is received within the frame and is caused to rotate within the frame. The stator is received within the frame and held stationary relative to the frame. The stator includes a first inlet and a second inlet. The first inlet receives working fluid from a first loop. The second inlet receives working fluid from a second loop, separate from the working fluid received from the first loop. The first inlet and the second inlet are configured to direct the working fluid to the rotor. The expander provides the working fluid from the first inlet together with the working fluid from the second inlet to a common line.

In still another embodiment, a waste heat recovery system includes a first loop, a second loop, a common line, a first heat exchanger, a second heat exchanger, an expander, and a recuperator. The first loop circulates working fluid. The second loop circulates the working fluid. The common line provides the working fluid to the first loop and the second loop. The first heat exchanger receives the working fluid from the first loop at a first temperature and provides the working fluid to the first loop at a second temperature greater than the first temperature. The second heat exchanger receives the working fluid from the second loop at a third temperature and provides the working fluid to the second loop at a fourth temperature greater than the third temperature. The expander receives the working fluid from the first loop at the second temperature. The expander separately receives the working fluid from the second loop at the fourth temperature. The expander provides the working fluid to the common line. The recuperator receives the working fluid from the first loop upstream of the recuperator. The recuperator provides the working fluid received from the first loop to the first loop downstream of the recuperator. The recuperator receives the working fluid from the second loop upstream of the recuperator. The recuperator provides the working fluid received from the second loop to the second loop downstream of the recuperator. The recuperator receives the working fluid from the common line upstream of the recuperator. The recuperator provides the working fluid received from the common line to the common line downstream of the recuperator.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
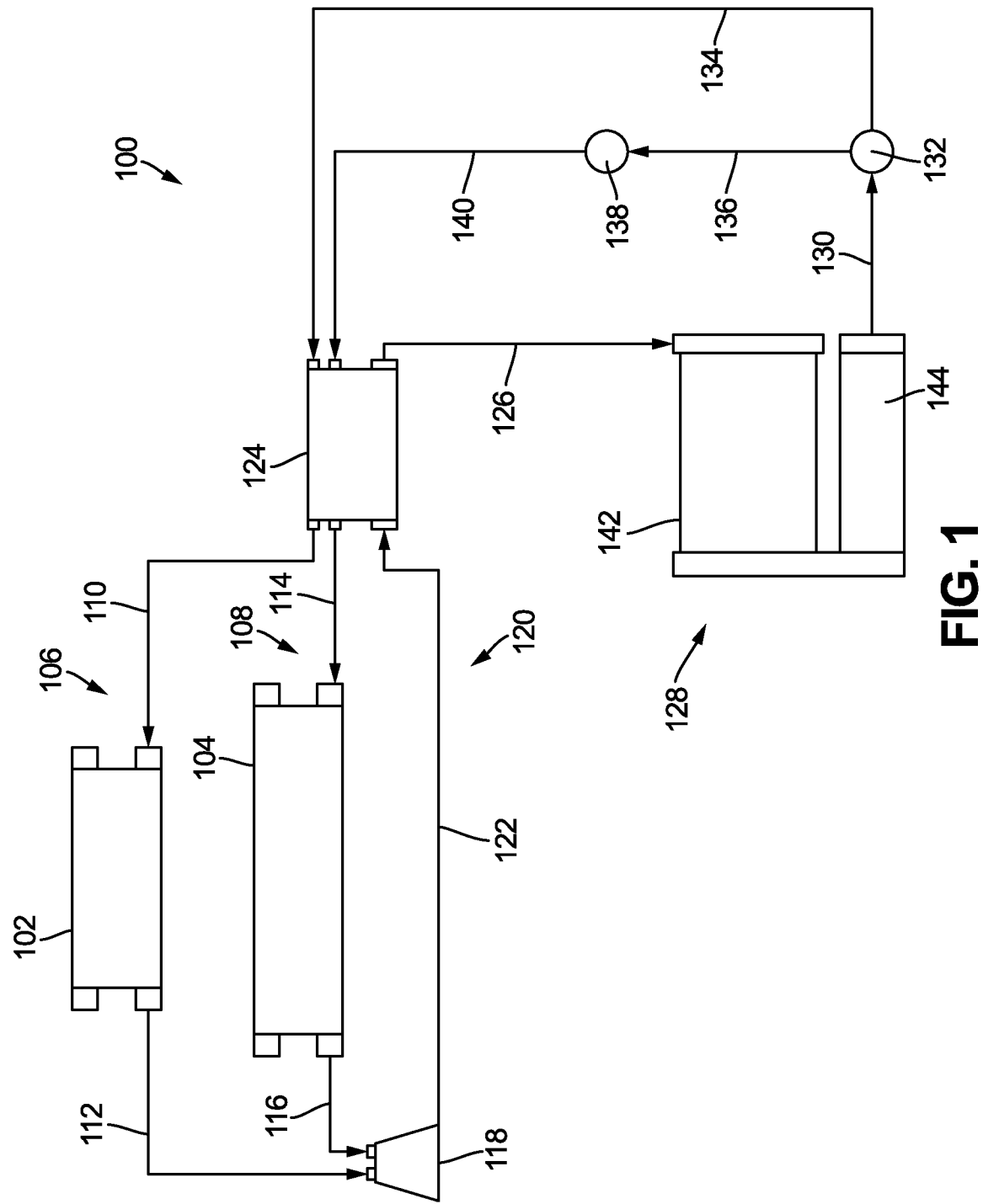
FIG. 1 is a block schematic diagram of an example waste heat recovery system having an example expander.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

The following are more detailed descriptions of various concepts related to, and implementations of, methods, apparatuses, and systems for an expander for use in a waste heat recovery system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce waste heat that is often converted, in part, into useful energy through the use of a waste heat recovery system. Internal combustion engines include several heat sources that reject heat to the atmosphere. Conventional waste heat recovery systems attempt to harvest this otherwise-wasted heat by transferring the heat to a fluid and then harnessing the energy stored in the fluid through the use of a rotor within an expander. Conventional waste heat recovery systems are usually only capable of recovering heat from a single heat source. In cases where recovery from two heat sources is possible, conventional waste heat recovery systems employ separate rotors for each heat source. For example, for two heat sources, a conventional waste heat recovery system may utilize two expanders, each having its own rotor. The additional rotors and/or expanders cause the conventional waste heat recovery system to become more expensive and complicated.

Implementations described herein relate to a waste heat recovery system that functions to recover heat from two different heat sources. The waste heat recovery system circulates a working fluid through a first loop, a second loop, and a common line. The first loop circulates the working fluid through a first heat exchanger associated with one of the heat sources, and the second loop circulates the working fluid through a second heat exchanger associated with the other of the heat sources. The waste heat recovery system includes an expander that receives the working fluid from the first loop, after collecting heat from the first heat source, and that receives the working fluid from the second loop, after collecting heat from the second heat source, separate from the working fluid received from the first loop. The expander harnesses energy within the working fluid and then provides the working fluid to the common line. A pump then draws the working fluid through the common line and provides the working fluid to the first loop and the second loop.

In some implementations, the expander includes a rotor. The expander uses the rotor to harness the energy from the working fluid. The expander uses a combination of the working fluid from the first loop and the working fluid from the second loop to cause rotation of the rotor. In some implementations, the expander includes separate sets of nozzles for receiving the working fluid from the first loop and the second loop. The sets of nozzles may be individually configured based on the temperature of the heat sources. In other implementations, the expander includes two rotors mounted on a single shaft. In these implementations, the working fluid provided from the first loop is harnessed by one rotor and the working fluid provided from the second loop is harnessed by the other rotor.

In some implementations, the waste heat recovery system includes a recuperator that operates on the first loop, the second loop, and the common line. The recuperator keeps the working fluid in each of the first loop, the second loop, and the common line separate within the recuperator. The waste heat recovery system also includes a heat exchanger which functions to cool the working fluid before providing the working fluid to a pump. The waste heat recovery system includes a second pump operating on one of the first loop and the second loop to further increase pressure within the first loop or the second loop.

In the implementations described herein, the expander receives working fluid from two separate loops and provides the working fluid to a common line which eventually provides the working fluid back to the two loops. The expander may include a single rotor which harnesses the energy from both of the loops simultaneously. The expander allows the waste heat recovery system described herein to be less expensive and complex than conventional waste heat recovery systems.

II. Overview of Waste Heat Recovery System

FIG. 1 depicts a waste heat recovery system 100 according to an exemplary embodiment. The waste heat recovery system 100 is operable to recover heat from a low temperature heat source using a low temperature heat exchanger 102 and from a high temperature heat source using a high temperature heat exchanger 104. The low temperature heat exchanger 102 and the high temperature heat exchanger 104 may recover heat from, for example, exhaust gas recirculation systems, exhaust streams (e.g., high temperature exhaust, low temperature exhaust, etc.), cylinder heads, cylinder blocks, manifolds, oil systems, oil heaters, coolant systems, charge air systems, high grade waste heat, low grade waste heat, and other similar sources, alone or in any combination. The low temperature heat exchanger 102 recovers heat from a first heat source that is defined by a first temperature relative to an ambient temperature. The high temperature heat exchanger 104 recovers heat from a second heat source that is defined by a second temperature relative to the ambient temperature. In many applications, the first temperature is less than the second temperature. Accordingly, more heat may be recovered from the high temperature heat exchanger 104 than from the low temperature heat exchanger 102.

The waste heat recovery system 100 includes a low pressure loop 106 and a high pressure loop 108. The low pressure loop 106 includes the low temperature heat exchanger 102, and the high pressure loop 108 includes the high temperature heat exchanger 104. Each of the low pressure loop 106 and the high pressure loop 108 circulate a working fluid. The working fluid absorbs heat when the working fluid passes through the low temperature heat exchanger 102 in the low pressure loop 106, and the high temperature heat exchanger 104 in the high pressure loop 108. The low pressure loop 106 and the high pressure loop 108 circulate the same working fluid. Depending on the application, the working fluid may comprise, for example, water, glycol, hydrofluorocarbons, perfluorocarbons, and other similar fluids.

The low pressure loop 106 includes a low pressure loop first portion 110 and a low pressure loop second portion 112. The low pressure loop first portion 110 provides the working fluid to the low temperature heat exchanger 102 (e.g., via an inlet of the low temperature heat exchanger 102, etc.) at a first temperature, $T_{L1}$, and the low pressure loop second portion 112 receives the working fluid from the low temperature heat exchanger 102 (e.g., via an outlet of the low temperature heat exchanger 102, etc.) at a second temperature, $T_{L2}$. During operation of the waste heat recovery system 100, $T_{L1}$ is less than $T_{L2}$. The difference between $T_{L1}$ and $T_{L2}$ is directly related to the temperature of the low temperature heat exchanger 102.

Similar to the low pressure loop 106, the high pressure loop 108 includes a high pressure loop first portion 114 and a high pressure loop second portion 116. The high pressure loop first portion 114 provides the working fluid to the high temperature heat exchanger 104 (e.g., via an inlet of the high temperature heat exchanger 104, etc.) at a first temperature, $T_{H1}$, and the high pressure loop second portion 116 receives the working fluid from the high temperature heat exchanger 104 (e.g., via an outlet of the high temperature heat exchanger 104, etc.) at a second temperature, $T_{H2}$. During operation of the waste heat recovery system 100, $T_{H1}$ is less than $T_{H2}$. The difference between $T_{H1}$ and $T_{H2}$ is directly related to the temperature of the high temperature heat exchanger 104.

The waste heat recovery system 100 also includes an expander 118. As will be explained in greater detail, the expander 118 comprises a dual-entry turbine expander. The expander 118 receives the working fluid from both the low pressure loop second portion 112 and from the high pressure loop second portion 116. The expander 118 harnesses pressure within the working fluid to produce mechanical energy. The expander 118 provides the working fluid into a common line 120 at a temperature, $T_{C1}$, which is a function of both $T_{L2}$ and $T_{H2}$.

The common line 120 is continuous with both of the low pressure loop 106 and the high pressure loop 108 such that the common line constitutes part of the low pressure loop 106 and part of the high pressure loop 108. The common line 120 includes a common line first portion 122 which receives the working fluid from the expander 118 and provides the working fluid to a recuperator 124 (i.e., the recuperator 124 receives the working fluid from the common line 120 upstream of the recuperator 124). The common line 120 also includes a common line second portion 126 which receives the working fluid from the recuperator 124 (i.e., the recuperator 124 provides the working fluid to the common line 120 downstream of the recuperator 124). The common line second portion 126 also provides the working fluid to a heat exchanger 128.

The recuperator 124 is configured to (e.g., is structured to, etc.) transfer heat from the common line 120. According to various embodiments, the recuperator 124 is configured to transfer heat from the common line 120 to both of the low pressure loop 106 and the high pressure loop 108. The low pressure loop 106, the high pressure loop 108, and the common line 120 are all separate within the recuperator 124 such that no intermixing of the working fluid occurs between the low pressure loop 106, the high pressure loop 108, and the common line 120 within the recuperator 124.

The recuperator 124 provides the working fluid to the common line second portion 126 (i.e., downstream of the recuperator 124) at a temperature, $T_{C2}$, which is less than $T_{C1}$. The difference between $T_{C1}$ and $T_{C2}$ may be related to an efficiency of the waste heat recovery system 100. The recuperator 124 may be, for example, a cross plate heat exchanger, a vertical flat panel recuperator, a horizontal flat panel recuperator, or a cellular recuperator. The common line 120 also includes a common line third portion 130 which receives the working fluid from the heat exchanger 128 and provides the working fluid to a first pump 132 at a temperature $T_{C3}$ at a pressure $P_1$. The heat exchanger 128 is configured to cool the working fluid provided by the common line second portion 126 such that $T_{C3}$ is less than $T_{C2}$. The difference between $T_{C2}$ and $T_{C3}$ may be related to an efficiency of the waste heat recovery system 100.

In contrast to heat exchangers used in conventional waste heat recovery systems, the recuperator 124 receives the working fluid from the expander 118 via a single inlet through the use of the common line 120. In conventional waste heat recovery systems, loops are kept separate through the expander and the heat exchanger. This difference allows the waste heat recovery system to operate more efficiently than conventional waste heat recovery systems. Also in contrast to heat exchangers used in conventional waste heat recovery systems, both the low pressure loop 106 and the high pressure loop 108 separately go through the recuperator 124. In conventional waste heat recovery systems, each loop typically has its own heat exchanger. This difference allows the waste heat recovery system 100 to be less expensive and require less space compared to conventional waste heat recovery systems. This difference also facilitates a lower pressure drop of working fluid within the common line 120 compared to conventional waste heat recovery systems with multiple heat exchangers.

The first pump 132 is configured to provide the working fluid from the common line third portion 130 to a low pressure loop third portion 134 of the low pressure loop 106 and to a high pressure loop third portion 136 of the high pressure loop 108, separate from the working fluid provided to the low pressure loop third portion 134. The first pump 132 causes the working fluid to be propelled into the low pressure loop third portion 134 and into the high pressure loop third portion 136, thereby increasing a pressure of the working fluid from $P_1$ to a pressure $P_2$. In some embodiments, the first pump 132 functions as a flow divider. Accordingly, the first pump 132 may include a flow diverter (e.g., electronically controllable valve, Y-fitting, etc.). In an alternative embodiment, the first pump 132 does not include a flow divider and does not function to provide the working fluid from the common line third portion 130 to the low pressure loop third portion 134 and to the high pressure loop third portion 136, separate from the working fluid provided to the low pressure loop third portion 134. In this embodiment, the first pump 132 provides the working fluid to the common line 120 that includes a flow divider downstream of the first pump 132. This flow divider functions to provide the working fluid from the common line third portion 130 to the low pressure loop third portion 134 and to the high pressure loop third portion 136, separate from the working fluid provided to the low pressure loop third portion 134.

In one alternative embodiment, the flow divider is used to selectively prevent the working fluid from flowing through one of the low pressure loop 106 and the high pressure loop 108. In this way, components of the waste heat recovery system 100 may be maintained and/or more desirable operation of the waste heat recovery system 100 may be achieved. For example, the first pump 132 may be electronically controlled and may receive a signal (e.g., from a controller, from a mobile device, etc.) to selectively block flow to the high pressure loop 108. A maintenance worker may then, for example, inspect portions of the high pressure loop 108.

The waste heat recovery system 100 also includes a second pump 138. The second pump 138 is configured to receive the working fluid from the high pressure loop third portion 136 and to provide the working fluid to a high pressure loop fourth portion 140 of the high pressure loop 108. The second pump 138 is configured to increase the pressure of the working fluid in the high pressure loop 108 from $P_2$ to $P_3$. The first pump 132 and the second pump 138 may comprise, for example, a positive displacement pump, a rotary pump, a reciprocating pump, an impulse pump, a velocity pump, and other similar pumps.

The low pressure loop third portion 134 provides the working fluid to the recuperator 124 at a third temperature, $T_{L3}$ (i.e., the recuperator 124 receives the working fluid from the low pressure loop 106 upstream of the recuperator 124). Similarly, the high pressure loop fourth portion 140 provides the working fluid to the recuperator 124 at a third temperature, $T_{H3}$ (i.e., the recuperator 124 receives the working fluid from the high pressure loop 108 upstream of the recuperator 124). After passing through the recuperator 124, the working fluid from the low pressure loop 106 is provided to the low pressure loop first portion 110 (i.e., the recuperator 124 provides the working fluid to the low pressure loop 106 downstream of the recuperator 124). Similarly, after passing through the recuperator 124, the working fluid from the high pressure loop 108 is provided to the high pressure loop first portion 114 (i.e., the recuperator 124 provides the working fluid to the high pressure loop 108 downstream of the recuperator 124). The recuperator 124 functions to increase the temperature of the working fluid in the low pressure loop 106 and the high pressure loop 108 by transferring heat from the common line 120. According to various embodiments, $T_{L3}$ is less than $T_{L1}$, and $T_{H3}$ is less than $T_{H1}$. The efficiency of the waste heat recovery system 100 may be related to the difference between $T_{L3}$ and $T_{L1}$ and the difference between $T_{H3}$ and $T_{H1}$.

According to various embodiments, the heat exchanger 128 includes a condenser 142 and a subcooler 144. The condenser 142 is configured to receive the working fluid from the common line second portion 126 and to provide the working fluid to the subcooler 144. The subcooler 144 is configured to provide the working fluid to the common line third portion 130. The condenser 142 may function to condense the working fluid and the subcooler 144 may function to subcool the condensed working fluid.

In some embodiments, the waste heat recovery system 100 does not include the recuperator 124. In these embodiments, the low pressure loop third portion 134 is connected directly to the low pressure loop first portion 110, the high pressure loop fourth portion 140 is connected directly to the high pressure loop first portion 114, and the common line first portion 122 is connected directly to the common line second portion 126. These embodiments may be particularly useful when both of the low temperature heat exchanger 102 and high temperature heat exchanger 104 have relatively high temperatures compared to other embodiments.

In other embodiments, the recuperator 124 is connected to the common line 120 and only one of the low pressure loop 106 and the high pressure loop 108. For example, in some applications the recuperator 124 receives working fluid from the low pressure loop third portion 134 and provides that working fluid to the low pressure loop first portion 110 and receives working fluid from the common line first portion 122 and provides that working fluid to the common line second portion 126, while the high pressure loop fourth portion 140 is connected directly to the high pressure loop first portion 114. In another example, the recuperator 124 receives working fluid from the high pressure loop fourth portion 140 and provides that working fluid to the high pressure loop first portion 114 and receives working fluid from the common line first portion 122 and provides that working fluid to the common line second portion 126, while the low pressure loop third portion 134 is connected directly to the low pressure loop first portion 110.

Figure 2:
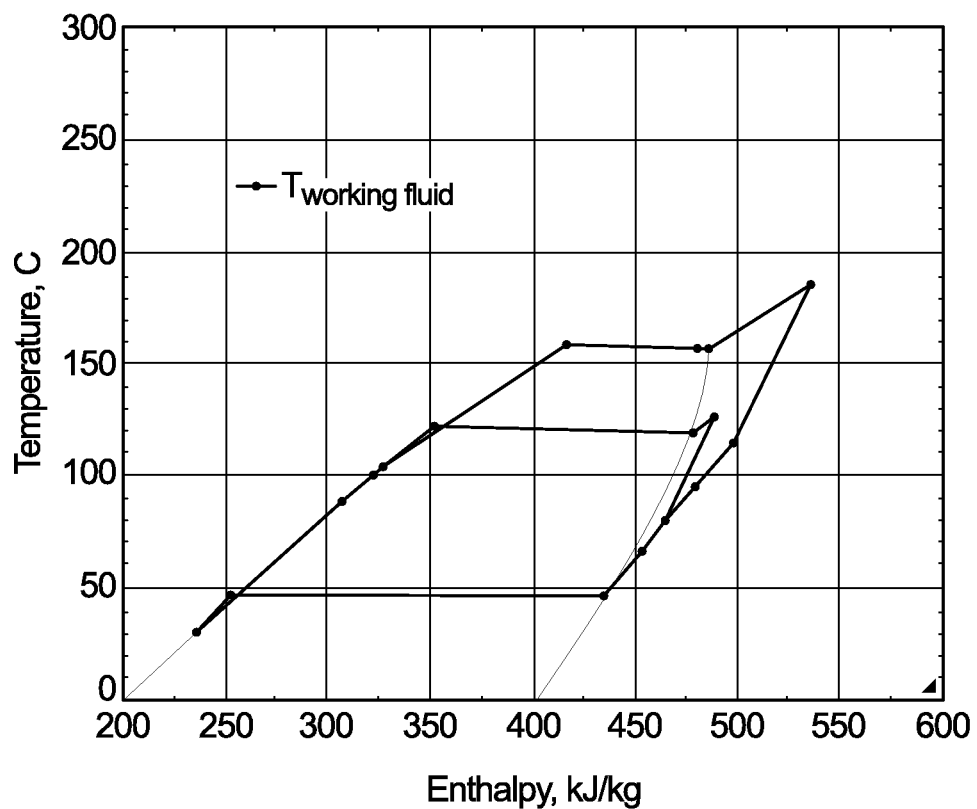
FIG. 2 is a plot of temperature against enthalpy for working fluid operating a waste heat recovery system, such as the waste heat recovery system shown in FIG. 1.

FIG. 2 illustrates a plot of the temperature of the working fluid in the waste heat recovery system 100 as a function of enthalpy of the working fluid. As shown in FIG. 2, the waste heat recovery system 100 implements several isothermal processes where the temperature of the working fluid remains substantially constant while the enthalpy changes.

Figure 3:
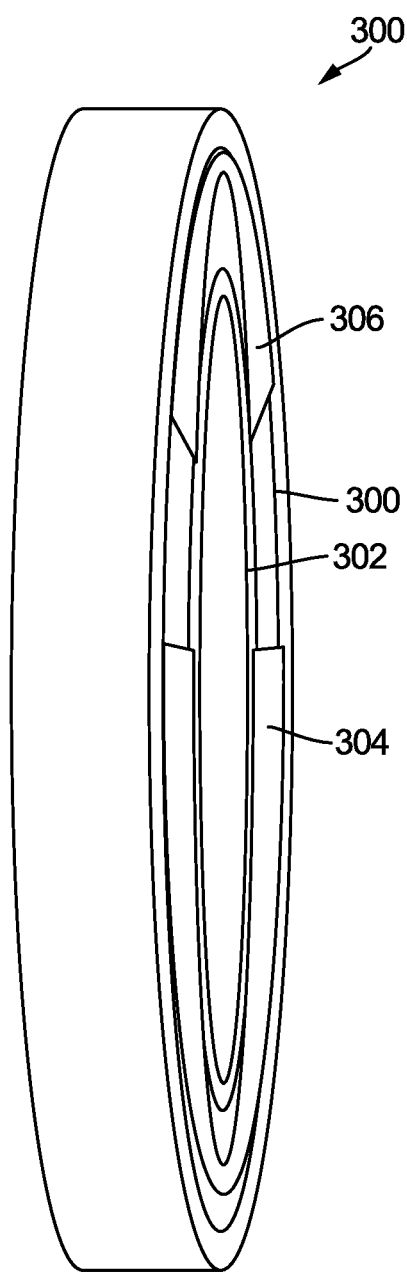
FIG. 3 is a side perspective view of a stator for the expander used in the waste heat recovery system shown in FIG. 1.
Figure 4:
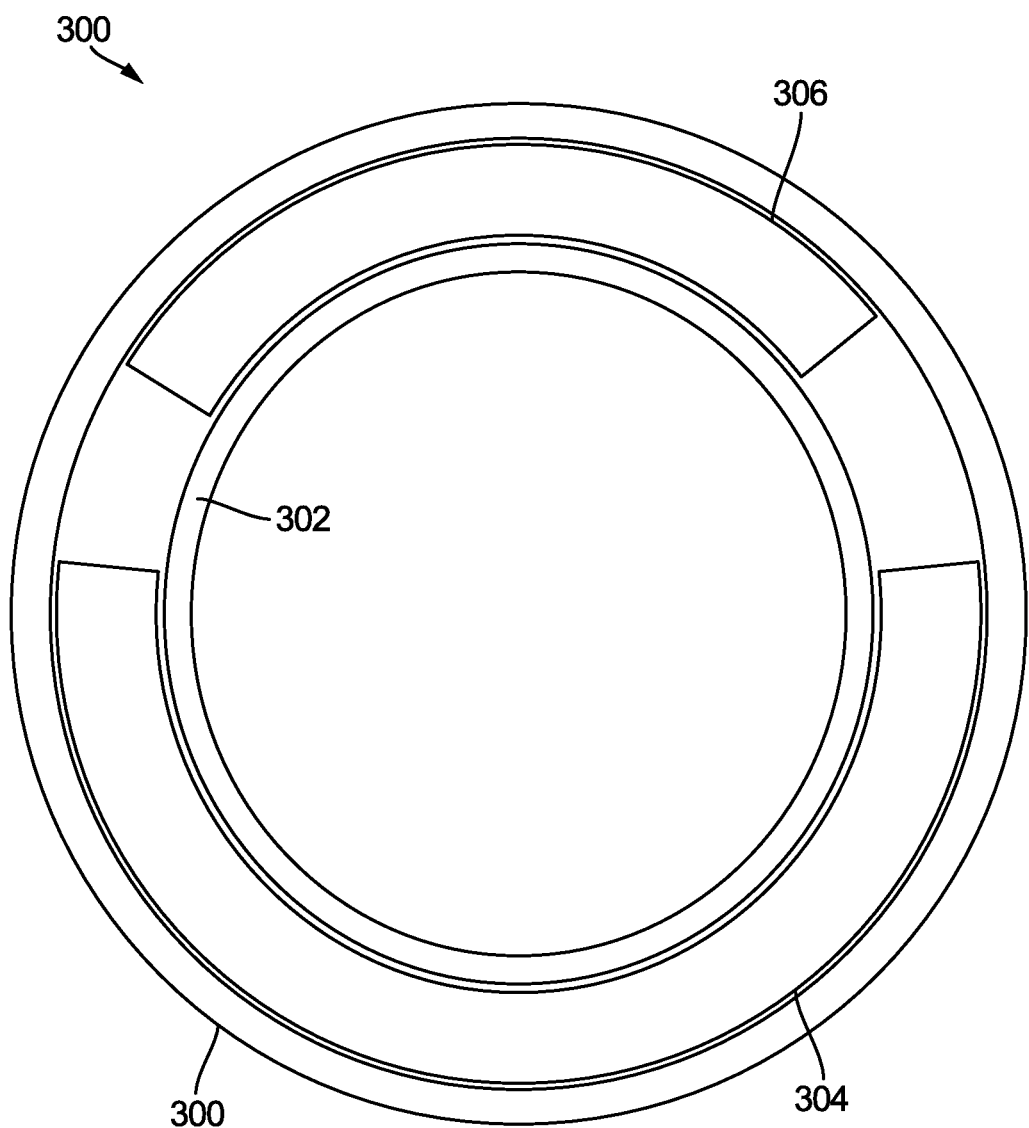
FIG. 4 is a right side view of the stator shown in FIG. 3.
Figure 5:
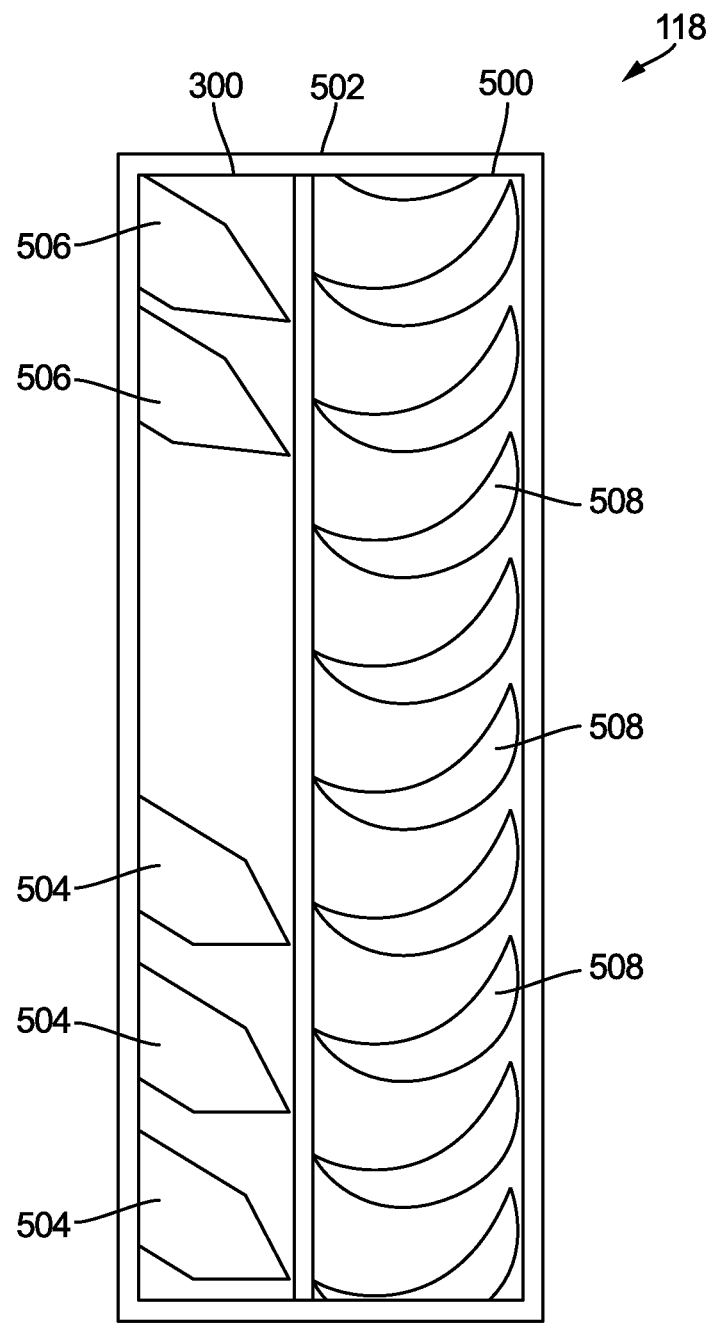
FIG. 5 is a cross-sectional view of the expander used in the waste heat recovery system shown in FIG. 1.

FIGS. 3-5 illustrate the expander 118 and components thereof in detail, according to an exemplary embodiment. According to various embodiments, the expander 118 includes a stator 300 defining an aperture 302, a first inlet 304, and a second inlet 306. The stator 300 is configured to be coupled to a structure (e.g., mount, etc.). As shown in FIG. 4, the stator 300 is ring-shaped. The aperture 302 is configured to receive a shaft. The first inlet 304 is configured to receive the working fluid from the low pressure loop first portion 110, and the second inlet 306 is configured to receive the working fluid from the high pressure loop first portion 114. Each of the first inlet 304 and the second inlet 306 is contained within the stator 300.

The first inlet 304 is defined by a first area, and the second inlet 306 is defined by a second area. In some embodiments, the first set of nozzles 504 and the second set of nozzles 506 are configured based on a difference between the area of the first inlet 304 and the area of the second inlet 306.

According to various embodiments, the first inlet 304 and the second inlet 306 are configured differently based on the temperature of at least one of the low temperature heat exchanger 102 and the high temperature heat exchanger 104 in order to optimize the pressure $P_3$ and the pressure $P_2$. For example, the first inlet 304 and the second inlet 306 may be larger or smaller depending on the low temperature heat exchanger 102 and the high temperature heat exchanger 104. In an exemplary embodiment, the first inlet 304 is larger (i.e., based on area) than the second inlet 306.

As shown in FIG. 5, the expander 118 includes the stator 300 and a rotor 500. The stator 300 and the rotor 500 are held by a frame 502, such that the rotor 500 may rotate within the frame 502, relative to the stator 300. The stator 300 includes a first set (e.g., plurality, etc.) of nozzles 504 and a second set of nozzles 506. In some embodiments, the first set of nozzles 504 defines the first inlet 304, and the second set of nozzles 506 defines the second inlet 306. In other embodiments, the first set of nozzles 504 is contained within the first inlet 304, and the second set of nozzles 506 is contained within the second inlet 306. In these embodiments, the working fluid is prevented from circumventing the first set of nozzles 504 and the second set of nozzles 506.

The first set of nozzles 504 is configured to receive the working fluid from the low pressure loop first portion 110, and the second set of nozzles 506 is configured to receive the working fluid from the high pressure loop first portion 114. In this way, the expander 118 receives the working fluid from the low pressure loop 106 separately from the working fluid received from the high pressure loop 108. The first set of nozzles 504 and the second set of nozzles 506 are configured to individually propel the working fluid through the stator 300 to the rotor 500. In some embodiments, the first set of nozzles 504 and the second set of nozzles 506 direct the working fluid onto the rotor 500. As shown in FIG. 5, the first set of nozzles 504 and the second set of nozzles 506 are each angled relative to the stator 300. For example, the first set of nozzles 504 may be defined by a first angle relative to the stator 300, and the second set of nozzles 506 may be defined by a second angle relative to the stator 300 that is greater than the first angle. In these ways, the first set of nozzles 504 and the second set of nozzles 506 are able to utilize the working fluid to independently create cooperating rotational forces on the rotor 500.

The rotor 500 includes a plurality of rotor blades 508. The rotor blades 508 are configured to receive the working fluid from the first set of nozzles 504 and the second set of nozzles and to transfer energy from the working fluid into rotational energy. Each of the plurality of rotor blades 508 is defined by an incident angle. According to various embodiments, each of the plurality of rotor blades 508 is defined by the same incident angle. In some applications, each of the plurality of rotor blades 508 is shaped such that the flow of working fluid, which occurs in a substantially-axial direction, contacts the rotor blade 508, thereby causing the rotor 500 to rotate. This rotation may then be harnessed and turned into, for example, electricity, or to power an accessory, a gear drive, or a belt drive. After passing over the rotor blades 508, the working fluid from the first set of nozzles 504 is combined with the working fluid from the second set of nozzles 506. The combined working fluid is then provided to the common line first portion 122. In this way, the rotor 500 is common to both the low pressure loop 106 and the high pressure loop 108. In contrast, conventional expanding devices only are capable of receiving fluid from a single loop.

Each of the first set of nozzles 504 and each of the second set of nozzles 506 is defined by a target pressure reduction. The target pressure reduction is related to the pressure induced on the rotor blades 508 by the working fluid expelled from each of the first set of nozzles 504 or each of the second set of nozzles 506. The target pressure reduction is also related to a pressure of the working fluid in the low pressure loop second portion 112 and a pressure of the working fluid in the high pressure loop second portion 116.

Depending on the application, the first set of nozzles 504 and the second set of nozzles 506 may be varied such that the target pressure of the first set of nozzles 504 and the second set of nozzles 506 is tailored for a target application. In some embodiments, the target pressure of the first set of nozzles 504 is equal to the target pressure of the second set of nozzles 506. According to various embodiments, the first set of nozzles 504 is configured to provide a first target pressure based on the low temperature heat exchanger 102, and the second set of nozzles 506 is configured to provide a second target pressure, different from the first target pressure, based on the high temperature heat exchanger 104. In some embodiments, the first set of nozzles 504 and the second set of nozzles 506 are configured to provide working fluid to the rotor 500 with similar mass velocities. In some embodiments, the first set of nozzles 504 is configured based on the temperature $T_{L2}$, and the second set of nozzles 506 is configured based on the temperature $T_{H2}$.

The expander 118 is advantageous over conventional expanding devices because the expander 118 simultaneously receives the working fluid from the low pressure loop 106 and the working fluid from the high pressure loop 108. In contrast, conventional expanding devices require two, partial admission turbines. By using the stator 300 and the rotor 500, the expander 118 eliminates the need for two turbines and is thereby less expensive and less complex than conventional expanding devices. For example, the expander 118 requires only a single bearing set whereas conventional expanding devices typically require two or more bearing sets. The two turbines of a conventional expanding device each suffer from their own windage and frictional losses. The two turbines of a conventional expanding device also provide a significant overhang load which is undesirable. The expander 118 minimizes the windage and friction losses and reduces overhang load compared to conventional expanding devices.

A diameter of the rotor 500 (e.g., major diameter, etc.) may be significantly greater than a diameter of a rotor of a conventional expanding device, allowing the rotor 500 to rotate at a slower speed than the rotor of the conventional expanding device. This reduces or minimizes parasitic losses associated with the expander 118 and increases reliability of the expander 118 compared to conventional expanding devices. Further, a height of the rotor blades 508 may be greater than comparable heights of blades on two individual turbines.

Figure 6:
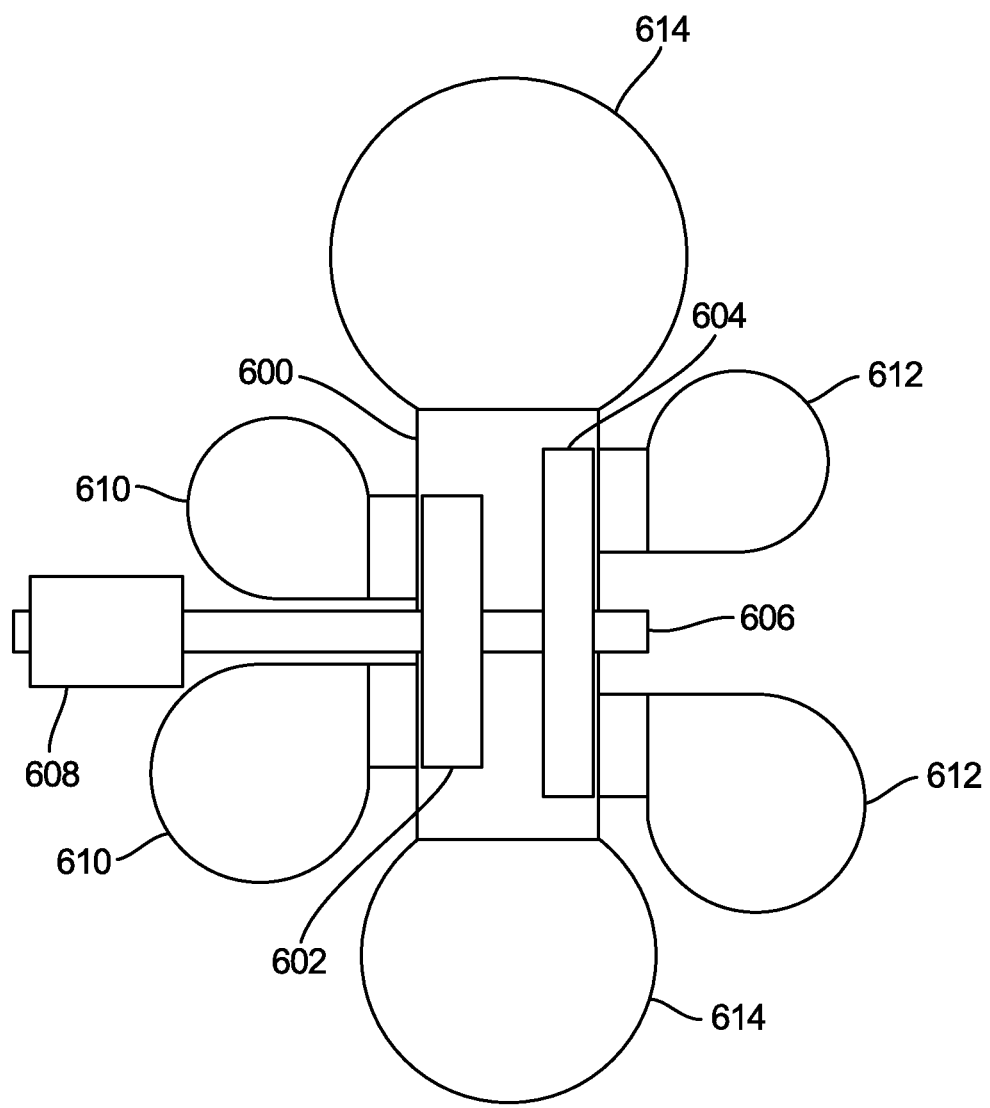
FIG. 6 is a cross-sectional view of another expander.

FIG. 6 illustrates the expander according to an alternative embodiment. As shown in FIG. 6, the expander 118 includes a frame 600, a first rotor 602, and a second rotor 604. The first rotor 602 and the second rotor 604 are configured to rotate within the frame 600 and relative to the frame 600. The expander 118 also includes a shaft 606 connected to a pinion 608 and to each of the first rotor 602 and the second rotor 604.

In this embodiment, the frame 600 operates similar to a combination of the frame 502 and the stator 300, as previously described. The first rotor 602 receives working fluid through a first inlet 610 in the frame 600. The first inlet 610 is on a first side of the frame 600. The first inlet 610 receives the working fluid from the low pressure loop 106. The second rotor 604 receives working fluid through a second inlet 612 in the frame 600. The second inlet 612 is on a second side of the frame 600, opposite the first side of the frame 600. The second inlet 612 receives the working fluid from the high pressure loop 108. Each of the first inlet 610 and the second inlet 612 may be at least partially annular such that the working fluid is received by the expander 118 circumferentially about the shaft 606. According to various embodiments, the first inlet 610 and the second inlet 612 each include a set of nozzles similar to the first set of nozzles 504 and the second set of nozzles 506, as previously described.

The first rotor 602 receives the working fluid provided by the first inlet 610 and transmits the working fluid to a common outlet 614 in the frame 600. Similarly, the second rotor 604 receives the working fluid provided by the second inlet 612 and transmits the working fluid to the common outlet 614. In some embodiments, the common outlet is disposed on a face of the expander 118 (e.g., on the frame 600, etc.) such as a face between the first inlet 610 and the second inlet 612. Forces of the working fluid on each of the first rotor 602 and the second rotor 604 cooperate to cause rotation of the shaft 606 because the shaft 606 is coupled to each of the first rotor 602 and the second rotor 604. Rotation of the shaft 606 is then transmitted to the pinion 608 where it is further transmitted to a rotational output, such as a gear train, a pump, a pulley, an alternator, a fan, or other similar device.

The first rotor 602 is defined by a first diameter, and the second rotor 604 is defined by a second diameter. According to various embodiments, the first diameter is greater than the second diameter. Either of the first rotor 602 and the second rotor 604 may include any number of blades, similar to the rotor blades 508 previously described. In some embodiments, the first rotor 602 has less rotor blades than the second rotor 604. The size of the rotor blades on the first rotor 602 may be different than the size of the rotor blades on the second rotor 604. For example, the rotor blades on the first rotor 602 may be smaller than the rotor blades on the second rotor 604.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "connected to," and the like, as used herein, mean the two components or objects have a pathway formed between the two components or objects in which a fluid, such as a working fluid, water, air, gaseous reductant, gaseous ammonia, etc., may flow, either with or without intervening components or objects. Examples of connections or configurations for connecting may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

What is claimed is:

1. A waste heat recovery system, comprising:
   a first heat exchanger that receives working fluid from a first portion of a first loop and provides the working fluid to a second portion of the first loop;
   a second heat exchanger that receives the working fluid from a first portion of a second loop and provides the working fluid to a second portion of the second loop;
   an expander that provides the working fluid to a first portion of a common line, the expander comprising:
      a stator comprising;
      a first inlet that receives the working fluid from the second portion of the first loop; and
      a second inlet that receives the working fluid from the second portion of the second loop; and
      a rotor that rotates relative to the stator;
      wherein the common line provides the working fluid to both the first loop and the second loop upstream of the first portion of the first loop and upstream of the first portion of the second loop; and
   a recuperator that receives the working fluid from a third portion of the first loop, provides the working fluid to the first portion of the first loop, receives the working fluid from a third portion of the second loop, and provides the working fluid to the first portion of the second loop.

2. The waste heat recovery system of claim 1, wherein the first inlet comprises a first set of nozzles.

3. The waste heat recovery system of claim 2, wherein the working fluid received by the first inlet is propelled through the first set of nozzles onto the rotor such that a first rotational force is created on the rotor.

4. The waste heat recovery system of claim 3, wherein the second inlet comprises a second set of nozzles.

5. The waste heat recovery system of claim 4, wherein the working fluid received by the second inlet is propelled through the second set of nozzles onto the rotor such that a second rotational force is created on the rotor; and
   wherein the first rotational force and the second rotational force cooperate to cause rotation of the rotor relative to the stator.

6. The waste heat recovery system of claim 1, wherein the stator further comprises a first set of nozzles and a second set of nozzles;
   wherein the first heat exchanger comprises a first heat source defined by a first temperature;
   wherein the second heat exchanger comprises a second heat source defined by a second temperature different from the first temperature;
   wherein the first set of nozzles is selected based on the first temperature; and
   wherein the second set of nozzles is selected based on the second temperature.

7. The waste heat recovery system of claim 1, wherein the first inlet defines a first area, wherein the second inlet defines a second area, and wherein the second area is larger than the first area.

8. The waste heat recovery system of claim 7, wherein the stator is ring-shaped and defines an aperture.

9. The waste heat recovery system of claim 1, wherein the recuperator also receives the working fluid from the first portion of the common line and provides the working fluid to a second portion of the common line.

10. The waste heat recovery system of claim 9, further comprising a third heat exchanger that receives the working fluid from the second portion of the common line and provides the working fluid to a third portion of the common line.

11. The waste heat recovery system of claim 10, wherein the third heat exchanger comprises a condenser and a subcooler separate from the condenser.

12. The waste heat recovery system of claim 10, further comprising a first pump that receives the working fluid from the third portion of the common line and separately provides the working fluid to the third portion of the first loop and to a fourth portion of the second loop.

13. The waste heat recovery system of claim 12, further comprising a second pump that receives the working fluid from the fourth portion of the second loop and provides the working fluid to the third portion of the second loop.

14. The waste heat recovery system of claim 1, wherein the expander further comprises:
   a second rotor that rotates relative to the stator; and
   a common outlet that provides the working fluid to the first portion of the common line, the common outlet disposed on a face of the expander between the first side of the expander and the second side of the expander.

15. The waste heat recovery system of claim 14, wherein the stator further comprises a first set of nozzles and a second set of nozzles;
   wherein the first inlet is disposed on a first side of the expander;
   wherein the second inlet is disposed on a second side of the expander, opposite the first side of the expander;
   wherein the working fluid received by the first inlet is propelled through the first set of nozzles onto the rotor such that a first rotational force is created on the rotor; and
   wherein the working fluid received by the second inlet is propelled through the second set of nozzles onto the second rotor such that a second rotational force is created on the second rotor.

16. A waste heat recovery system, comprising:
   a first loop circulating working fluid;
   a second loop circulating the working fluid;
   a common line that provides the working fluid to the first loop and the second loop;
   a first heat exchanger that receives the working fluid from the first loop at a first temperature and provides the working fluid to the first loop at a second temperature greater than the first temperature;
   a second heat exchanger that receives the working fluid from the second loop at a third temperature and provides the working fluid to the second loop at a fourth temperature greater than the third temperature;
   an expander that receives the working fluid from the first loop at the second temperature, that separately receives the working fluid from the second loop at the fourth temperature, and that provides the working fluid to the common line; and
   a recuperator that receives the working fluid from the first loop upstream of the recuperator, that provides the working fluid received from the first loop to the first loop downstream of the recuperator, that receives the working fluid from the second loop upstream of the recuperator, that provides the working fluid received from the second loop to the second loop downstream of the recuperator, that receives the working fluid from the common line upstream of the recuperator, and that provides the working fluid received from the common line to the common line downstream of the recuperator.

17. The waste heat recovery system of claim 16, wherein the expander comprises:
   a first set of nozzles that receives the working fluid from the first loop; and
   a second set of nozzles that receives the working fluid from the second loop.

18. The waste heat recovery system of claim 17, wherein the expander further comprises a rotor;
   wherein the first set of nozzles directs the working fluid received from the first loop onto the rotor; and
   wherein the second set of nozzles directs the working fluid received from the second loop onto the rotor.

* * * * *